(12) United States Patent
Fina et al.

(10) Patent No.: US 11,051,576 B2
(45) Date of Patent: Jul. 6, 2021

(54) SHOE WITH INTERCHANGEABLE SOLE

(71) Applicants: Paul Fina, Downers Grove, IL (US);
Ian Welsh, Villa Park, IL (US)

(72) Inventors: Paul Fina, Downers Grove, IL (US);
Ian Welsh, Villa Park, IL (US)

(*) Notice: Subject to any disclaimer, the term of this patent is extended or adjusted under 35 U.S.C. 154(b) by 173 days.

(21) Appl. No.: 15/646,925

(22) Filed: Jul. 11, 2017

(65) Prior Publication Data

US 2019/0014856 A1   Jan. 17, 2019

(51) Int. Cl.
| | | |
|---|---|---|
| *A43B 3/24* | (2006.01) |
| *A43B 5/02* | (2006.01) |
| *A43B 13/36* | (2006.01) |
| *A43C 15/16* | (2006.01) |
| *A43B 5/06* | (2006.01) |
| *B29D 35/00* | (2010.01) |

(52) U.S. Cl.
CPC .............. *A43B 3/246* (2013.01); *A43B 3/244* (2013.01); *A43B 5/02* (2013.01); *A43B 5/06* (2013.01); *A43B 13/36* (2013.01); *A43C 15/16* (2013.01); *B29D 35/0009* (2013.01)

(58) Field of Classification Search
CPC .. A43B 3/246; A43B 5/06; A43B 5/02; A43B 3/244; A43B 13/36; A43B 3/16; A43B 3/18; A43C 15/16
See application file for complete search history.

(56) References Cited

U.S. PATENT DOCUMENTS

| | | | | |
|---|---|---|---|---|
| 3,009,269 A * | 11/1961 | Folk | ........................ | A43B 3/16 36/7.5 |
| 3,890,725 A * | 6/1975 | Lea | ........................ | A43B 3/24 36/11.5 |
| 4,267,650 A | 5/1981 | Bauer | | |
| 4,420,894 A * | 12/1983 | Glassman | .............. | A43B 13/28 36/107 |
| 5,317,822 A * | 6/1994 | Johnson | ................. | A43B 13/36 36/101 |
| 5,410,821 A * | 5/1995 | Hilgendorf | .......... | A43B 1/0081 36/100 |
| 5,544,430 A * | 8/1996 | Jacko | ....................... | A43B 3/16 36/100 |
| 6,282,818 B1 * | 9/2001 | Lu | ............................. | A43B 3/24 36/100 |
| 6,311,413 B1 * | 11/2001 | Chern | .................. | A43B 13/182 36/100 |
| 6,345,454 B1 | 2/2002 | Cotton | | |
| 6,813,847 B2 * | 11/2004 | Workman | ................ | A43B 3/18 36/100 |

(Continued)

FOREIGN PATENT DOCUMENTS

CN 106820427 A 6/2017

OTHER PUBLICATIONS

International Search Report dated Oct. 29, 2018 issued in connection with International Application No. PCT/US2018/041629.

*Primary Examiner* — Katharine G Kane

(57) ABSTRACT

A shoe having a removable sole is provided. The shoe includes one or more straps that are insertable through corresponding apertures in the soles to attach a sole to a base of the shoe. The removable soles provide a shoe with capability to interchange soles, thereby providing for specialized soles to supply for a single shoe, which allows use of the shoe with various athletic sports.

18 Claims, 9 Drawing Sheets

(56) References Cited

U.S. PATENT DOCUMENTS

| | | | |
|---|---|---|---|
| 6,931,766 B2* | 8/2005 | Greene | A43B 3/122 36/100 |
| 7,210,251 B1* | 5/2007 | Rolle | A43B 1/0081 36/100 |
| 7,331,123 B2* | 2/2008 | Workman | A43B 5/08 36/100 |
| 7,669,352 B2* | 3/2010 | Stefani | A43B 3/24 36/101 |
| 8,037,621 B2* | 10/2011 | Hooper | A43B 1/04 36/3 A |
| 8,307,570 B2* | 11/2012 | Delgatty | A43B 1/0027 36/100 |
| 2002/0133974 A1* | 9/2002 | Bartolini | A43B 3/16 36/7.7 |
| 2002/0162202 A1* | 11/2002 | Kay | A43B 3/122 24/662 |
| 2003/0192205 A1* | 10/2003 | Linens | A43B 3/242 36/100 |
| 2004/0088883 A1* | 5/2004 | Workman | A43B 3/18 36/15 |
| 2005/0055844 A1 | 3/2005 | Yu | |
| 2011/0099847 A1 | 5/2011 | Koe-Krompecher | |
| 2012/0117817 A1* | 5/2012 | Chamberlin | A43B 1/0081 36/15 |
| 2012/0216429 A1* | 8/2012 | Bastida | A43B 3/122 36/25 R |
| 2013/0219751 A1* | 8/2013 | Catlett | A43B 3/122 36/101 |
| 2013/0255106 A1* | 10/2013 | Cho | A43B 3/122 36/101 |
| 2014/0075791 A1* | 3/2014 | Smith | A43B 1/0027 36/72 R |
| 2015/0020414 A1 | 1/2015 | Mulholland | |
| 2017/0086529 A1* | 3/2017 | Schindler | A43B 1/0027 |
| 2019/0116925 A1* | 4/2019 | Darby | A43B 7/1405 |

* cited by examiner

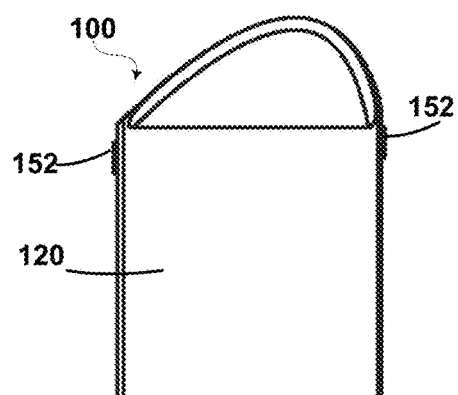
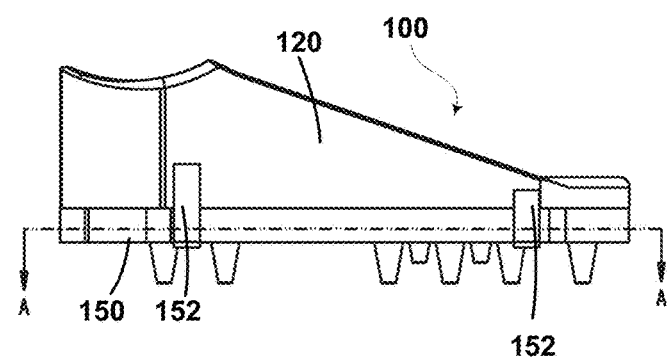
Figure 1d
Figure 1b
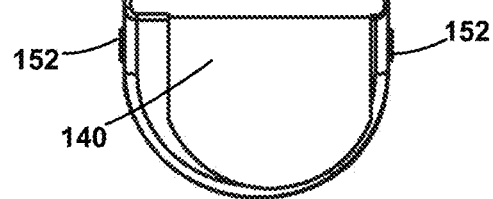
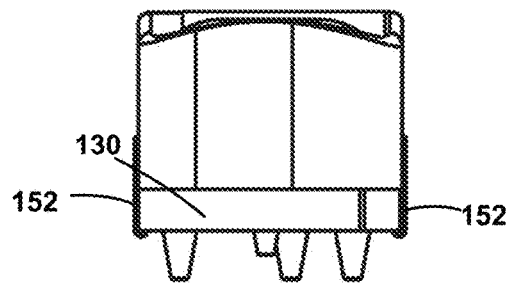
Figure 1c
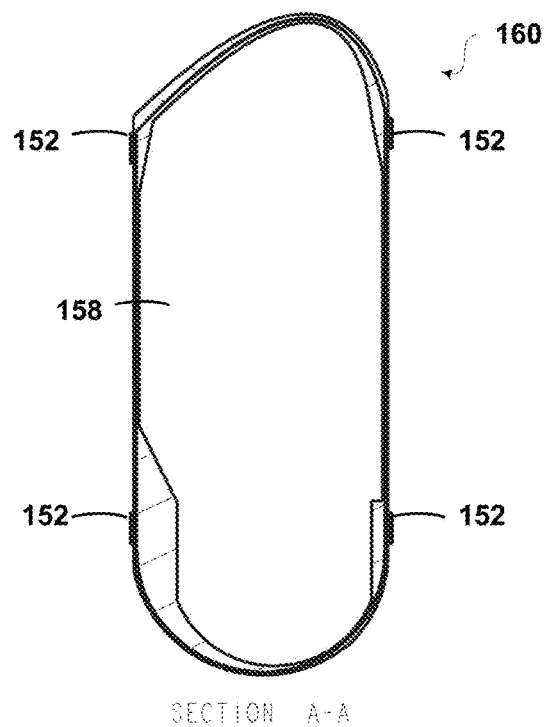
Figure 1e

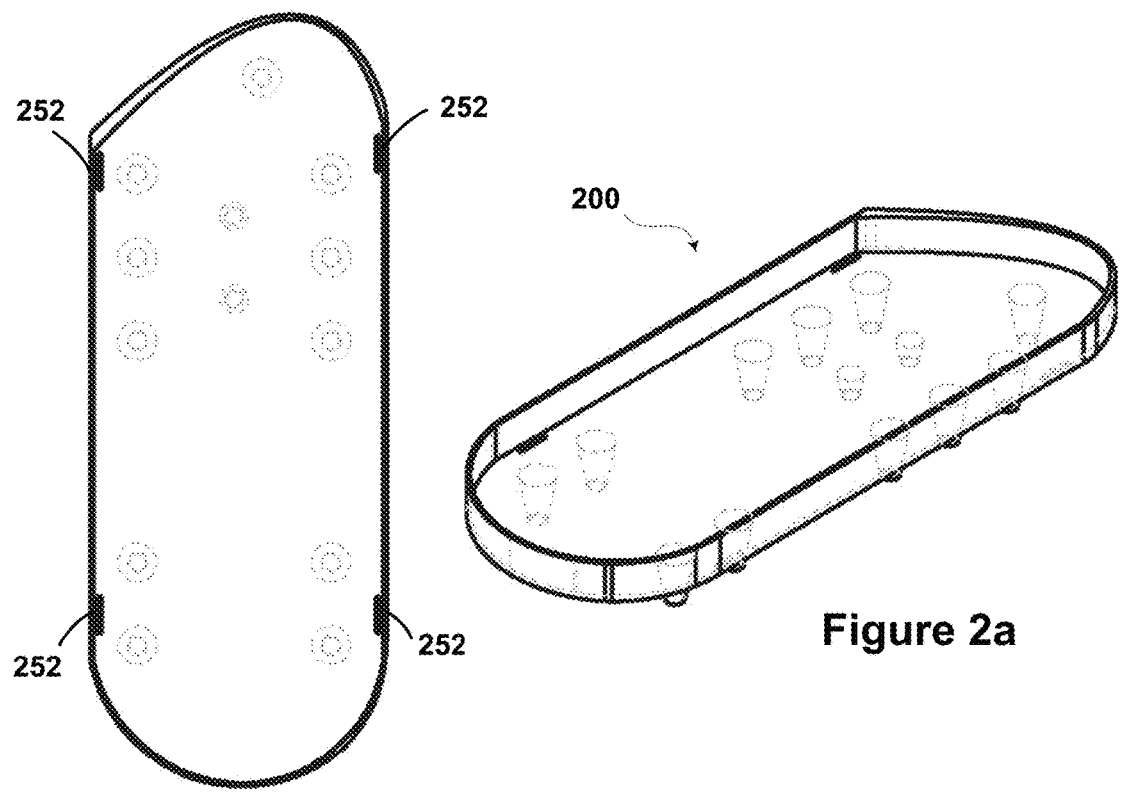
Figure 2a
Figure 2c
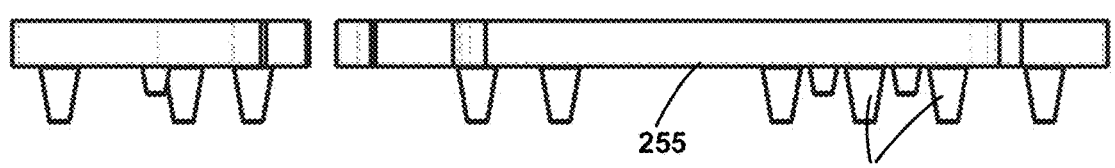
Figure 2d
Figure 2b

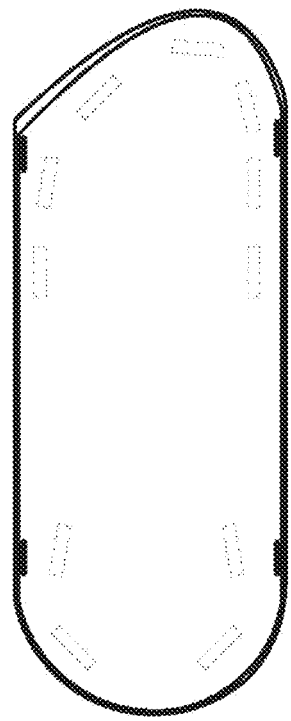
Figure 3c
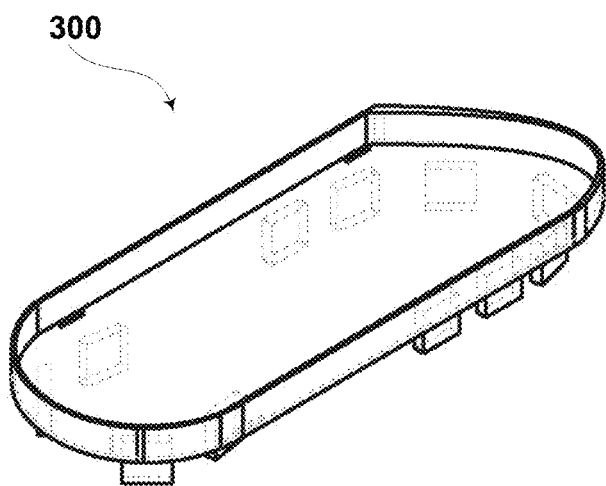
Figure 3a
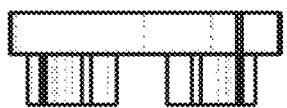
Figure 3d
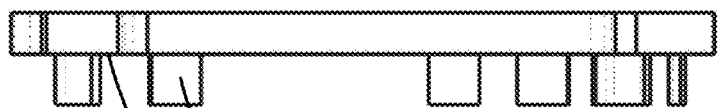
355  360   Figure 3b

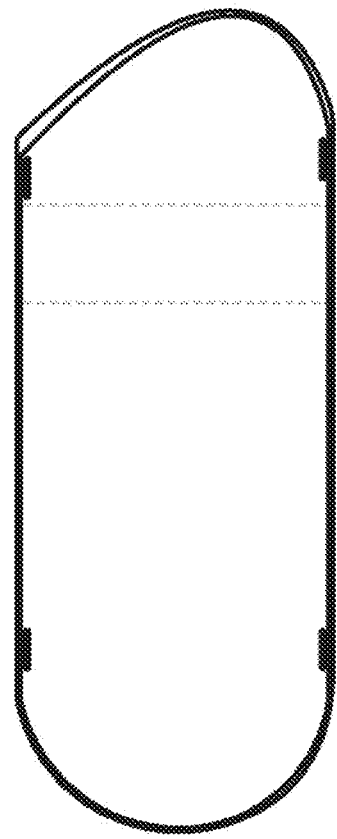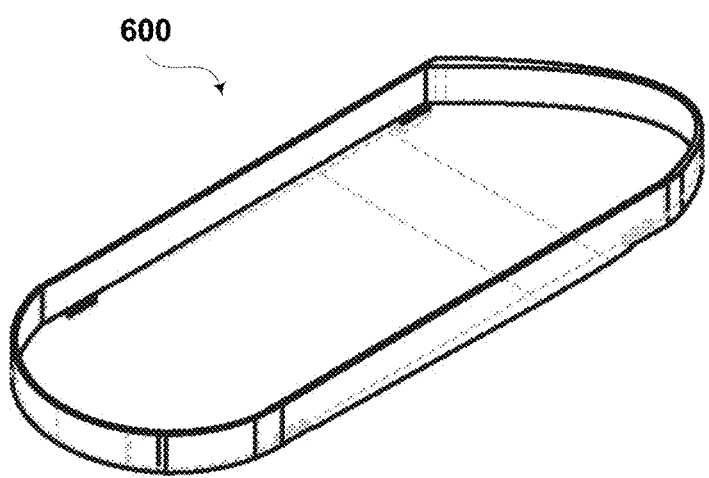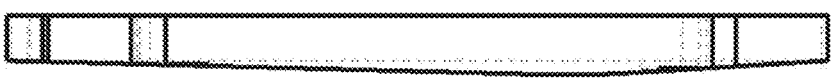
Figure 6a
Figure 6c
Figure 6d
Figure 6b

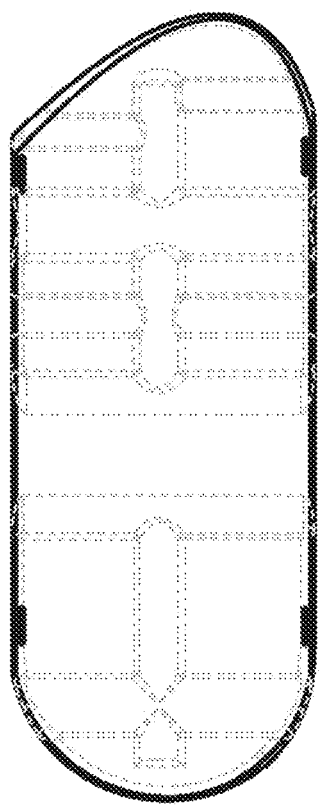
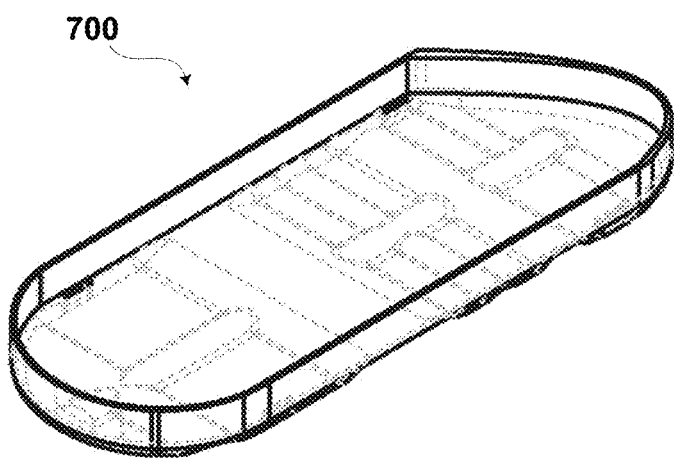
Figure 7a
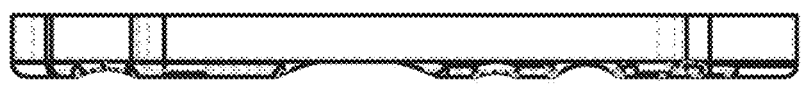
Figure 7d
Figure 7c
Figure 7b

SHOE WITH INTERCHANGEABLE SOLE

BACKGROUND

Unless otherwise indicated herein, the materials described in this section are not prior art to the claims in this application and are not admitted to be prior art by inclusion in this section.

Various athletic sports require specialized footwear. For example, one sport may demand performance of certain types of foot movements that are uncommon to other sports. Furthermore, different sports are performed on different play surfaces; e.g., grass field, turf field, rubberized track, and indoor and outdoor court surfaces. A bottom surface of a shoe may have a specialized tread to accommodate a particular desired type of foot movement for that sport or to engage a particular type of play surface. The variability in treads has led to specialized footwear for various sports.

As a result of the variability in footwear for various sports, the expense to purchase a pair of athletic shoes for each sport in which an individual wants to participate is great and renders affordability difficult. Lack of affordability is even more significant for children because of foot growth, requiring more frequent shoe purchases than for adults. However, utilizing footwear that is not adapted for the sport in which an individual participates can put that individual at a disadvantage with respect to other players wearing specialized footwear, and even at an increased risk for injury.

SUMMARY

An article of footwear is provided. In one aspect, the article of footwear comprises a shoe with an upper having a first layer extending from a toe portion to a heel portion, a base secured to the upper and having a bottom surface defined by an outer edge, the bottom surface comprising a forefoot region, a midfoot region, and a heel region. At least one strap extends from the base. A removable sole is formed to correspond in shape with the bottom surface of the base and has at least one aperture. The at least one strap is insertable through the at least one aperture.

In a further aspect, a sole structure for an article of footwear comprises a surface having a perimeter, an edge defining the perimeter, and at least one aperture extending through the surface of the sole structure. The sole structure is removably attachable to the article of footwear via a strap from the article of footwear extending through the at least one aperture.

In yet a further aspect, a method is provided. The method comprises providing a shoe having an attachment section and at least one strap comprising a first end and a second end, wherein the first end is connected to an exterior surface of the shoe, and providing a sole having at least one aperture. The method further comprises inserting the at least one strap through the at least one aperture and attaching the second end of the at least one strap to the attachment section.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 1b depicts a top view of the shoe of FIG. 1a, according to an example embodiment.

FIG. 1c depicts a rear view of the shoe of FIG. 1a, according to an example embodiment.

FIG. 1d depicts a side view of the shoe of FIG. 1a, according to an example embodiment.

FIG. 1e depicts a cross-sectional view taken from cross-section A-A in FIG. 1d, according to an example embodiment.

FIGS. 2a-d depict a football cleat sole, according to an example embodiment.

FIGS. 3a-d depict a baseball cleat sole, according to an example embodiment.

FIGS. 6a-d depict a track and field sole, according to an example embodiment.

FIGS. 7a-d depict a running sole, according to an example embodiment.

DETAILED DESCRIPTION

Figure 1A:
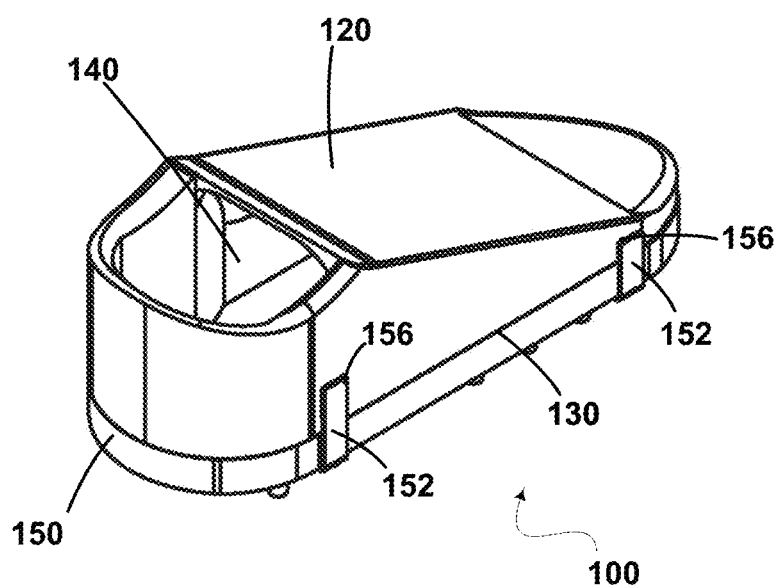
FIG. 1a depicts an example article of footwear, a shoe, having an interchangeable sole, according to an example embodiment.

Example athletic shoes and interchangeable soles are described herein. Any example embodiment or feature described herein is not necessarily to be construed as preferred or advantageous over other embodiments or features. The example embodiments described herein are not meant to be limiting. It will be readily understood that certain aspects of the disclosed apparatuses and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. OVERVIEW

Example embodiments disclosed herein generally relate to an article of footwear and to removable and interchangeable soles for an article of footwear. In some example embodiments, the article of footwear is an athletic shoe and each of the interchangeable soles comprises a tread tailored for use in a particular sport. Advantageously, a user need purchase only one pair of footwear and may then customize the footwear via the interchangeable soles to enable participation in a variety of sports. It is desirable for the interchangeable sole to provide for easy user installation and subsequent non-destructive removal from the article of footwear while remaining securely in place when attached to the footwear. It is also desirable to provide an easy to manufacture interchangeable sole structure.

The interchangeable sole for an article of footwear discussed herein provides an efficient system for interchanging a sole with a shoe base that securely attaches the sole to the base of the article of footwear.

To assist and clarify subsequent description of various embodiments, various terms are defined herein. Unless context indicates otherwise, the following apply throughout this specification, including the claims. "Shoe" and "article of footwear" are used interchangeably to refer to an article intended for wear on a human foot. A shoe may or may not enclose the entire foot of a wearer. For example, a shoe upper may include openings that expose portions of a wearer's foot. The "interior" of a shoe refers to a space occupied by a wearer's foot when the shoe is worn. An interior side or surface refers to a side or surface that is oriented toward the shoe interior. An exterior side or surface refers to a side or surface that is oriented away from the shoe interior.

Shoe elements may be described based on regions and/or anatomical structures of a human foot wearing that shoe, and by assuming that the interior of the shoe generally conforms to and is otherwise properly sized for the wearing foot. A forefoot region of a foot includes the phalanges, as well as the heads and bodies of the metatarsals. A forefoot element of a shoe is an element having one or more portions located over, under, to the lateral or medial side of, or in front of a wearer's forefoot when the shoe is worn. A midfoot region of a foot includes the cuboid, navicular, cuneiforms, and bases of the metatarsals. A midfoot element of a shoe is an element having one or more portions located over, under, to the lateral or medial side of a wearer's midfoot when the shoe is worn. A heel region of a foot includes the talus and/or the medial side of, and/or behind a wearer's heel when the shoe is worn. The heel element of a shoe is an element having one or more portions located over, under, to the lateral or medial side of a wearer's heel when the shoe is worn. The forefront region may overlap with the midfoot region, and the midfoot region may overlap with the heel region.

Unless indicated otherwise, a longitudinal axis refers to a horizontal heel-toe axis along the center of the foot that is roughly parallel to the second metatarsal and second phalanges. A transverse axis refers to a horizontal axis across the foot that is generally perpendicular to a longitudinal axis.

2. EXAMPLE ARTICLE OF FOOTWEAR

FIG. 1a depicts an example article of footwear, a shoe 100, having an interchangeable sole 150, according to an example embodiment. As shown in FIG. 1a, the shoe 100 may be an athletic shoe configured for use with various sports, including but not limited to football, basketball, baseball, soccer, and track and field, including long-distance and short-distance (e.g., sprinting) running. The shoe 100 is configured for wear on a left foot, and is part of a pair that includes a shoe (not shown) that is a mirror image of shoe 100 and is configured for wear on a right foot.

The shoe 100 comprises an upper 120 attached to a base structure 130. The upper 120 includes a shell formed to receive a foot within an interior chamber 140 of shoe 100, with an interior bottom surface forming a footbed. In one example embodiment, the upper 120 comprises a mesh layer allowing a foot within interior chamber 140 to breathe. The mesh layer may be made of ethylene vinyl acetate, for example. The base structure 130 may be made of a hard plastic, such as high-density polyethylene (HDPE) or acrylonitrile butadiene styrene (ABS) plastic, in some example embodiments. The upper 120 comprises an attachment section (shown in FIG. 1f) configured to receive or mate with a corresponding strap 152.

In one example embodiment, the base structure 130 is formed via an injection molding process. In some example embodiments, a soft layer such as a foam layer may be formed along the top surface of the hard plastic layer of the base structure 130 to serve as a footbed, providing cushioning for a wearer's foot. The foam layer may comprise a memory foam pad, which molds to the foot of the wearer to ensure both a tight fit with the shoe and prevent discomfort. The base structure 130 may be affixed to the upper 120 via an adhesive.

The at least one strap 152 serves to provide a secure connection between the sole 150 and the base 130. Each strap 152 has two ends, a first end 154 (shown in FIGS. 1f-1g) that is affixed to or is made integral with the shoe 100, and a second end 156. The second end 156 is a free end and may comprise an attachment section, such as a hook and loop attachment structure, (e.g., Velcro®), an adhesive, or a snap element, for example. Other attachment mechanisms may also be envisioned. A corresponding attachment section, such as a hook and loop attachment structure, an adhesive, or a snap element, is located on the shoe 100. In operation, the attachment section on the second end 156 affixes to the attachment section of the shoe 100.

FIG. 1b depicts a top view of the shoe 100 of FIG. 1a, according to an example embodiment. The embodiment of FIG. 1b shows four straps 152, with two straps 152 on the left side and two straps 152 on the right side of the shoe 100. However, other embodiments may comprise more or less straps 152 extending from either side of a shoe. In one example embodiment, straps 152 may be affixed to and extend from a surface of the base structure 130, such as a bottom surface of the base structure 130, for example. In another embodiment, straps 152 may extend from an exterior surface or wall of the base structure 130.

FIG. 1c depicts a rear view of the shoe 100 of FIG. 1a, according to an example embodiment. In FIG. 1c, the heel element of the shoe 100 is shown.

FIG. 1d depicts a side view of the shoe 100 of FIG. 1a, according to an example embodiment. As shown in FIG. 1d, the straps 152 may comprise differing lengths to accommodate affixation to attachment sections positioned at varying locations of the shoe 100. For example, in FIG. 1d, the strap 152 toward or within the heel element of the shoe 100 is shown to be longer than the strap 152 that is attached toward or within the forefoot element of the shoe 100. The shorter strap 152 accommodates the decrease in shoe 100 height toward or within the forefront element of the shoe 100.

FIG. 1e depicts a cross-sectional view 160 taken from cross-section A-A of FIG. 1d. The cross-section A-A is taken from the sole 150, and the hatch marks in FIG. 1e represent where the cross-section A-A is in relation to the side view of FIG. 1d. The sole 150 may be formed using an injection molding process, in one example embodiment. The sole 150 comprises a surface 158 conforming in shape to correspond with a bottom surface of the base 130. Through the surface 158 of the sole 150 is formed at least one slit (shown in example sole embodiments of FIGS. 2c, 3c, 4c, 5d, 6c, and 7d). In one embodiment, the at least one slit comprises an aperture that extends through the surface. Each slit is positioned at a location along the sole 150 to receive a strap 152 second end 156 therethrough when the sole 150 is positioned to conform with the shape of and mate with the base structure 130.

Figure 1F:
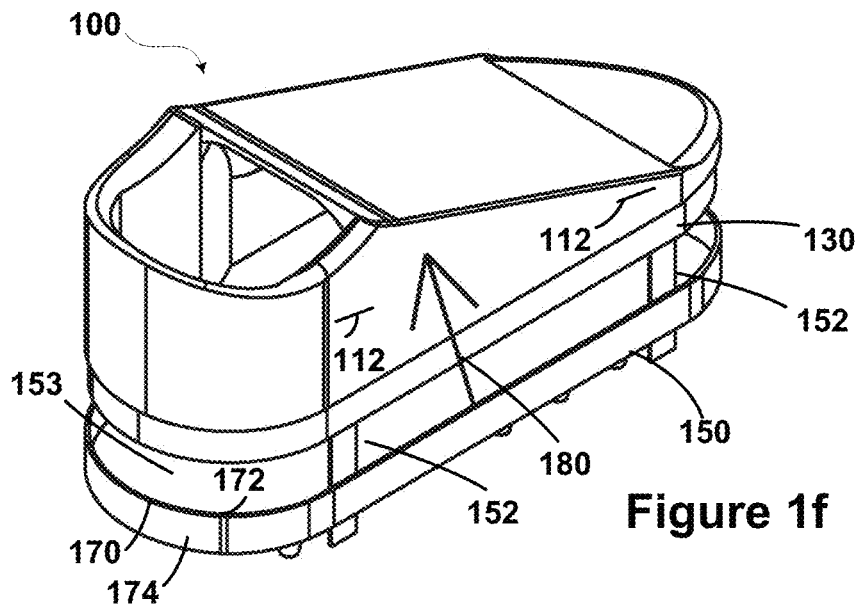
FIG. 1f depicts an example affixation of a sole to the shoe of FIG. 1a, according to an example embodiment.
Figure 1G:
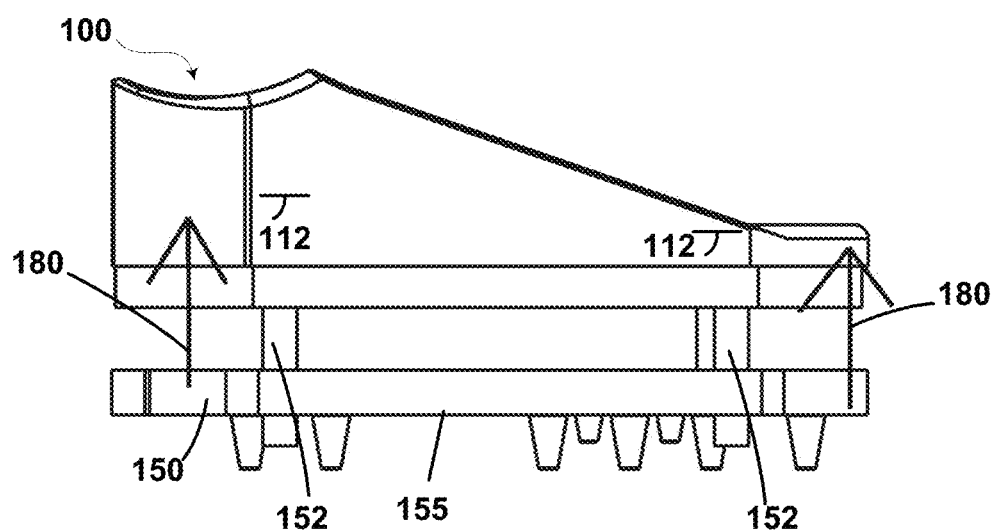
FIG. 1g depicts a side view of the affixation of the sole to the shoe of FIG. 1f, according to an example embodiment.
Figure 4A:
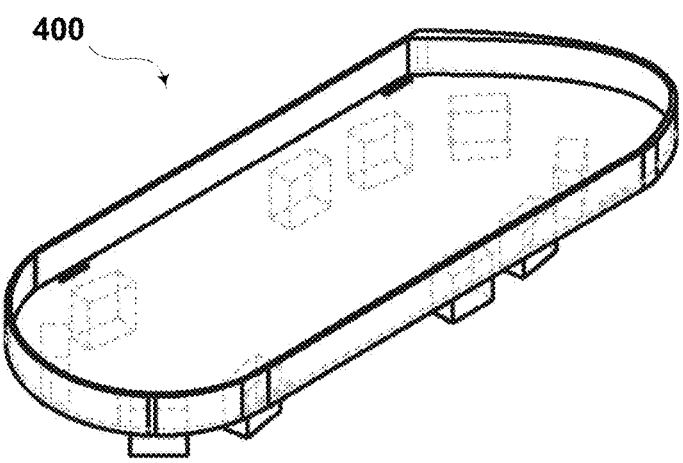
FIGS. 4a-d depict a soccer cleat sole, according to an example embodiment.
Figure 4C:
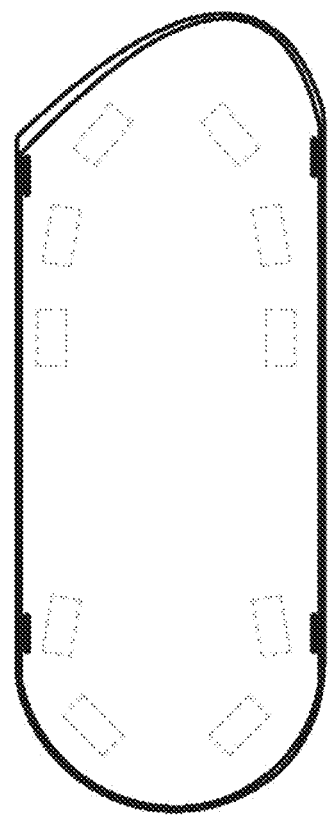
Figure 4D:
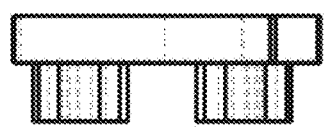
Figure 4B:
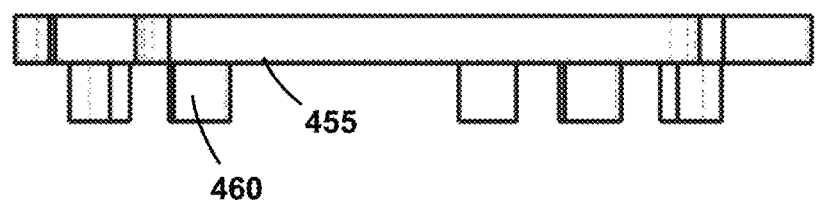
Figure 5A:
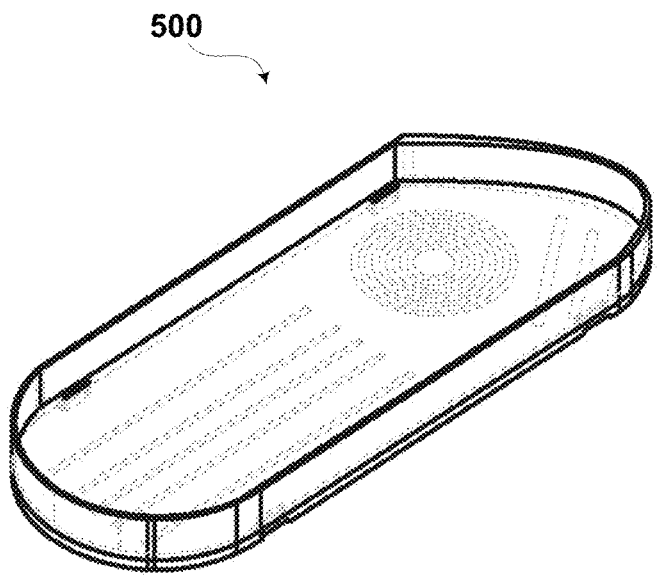
FIGS. 5a-d depict a basketball sole, according to an example embodiment.
Figure 5D:
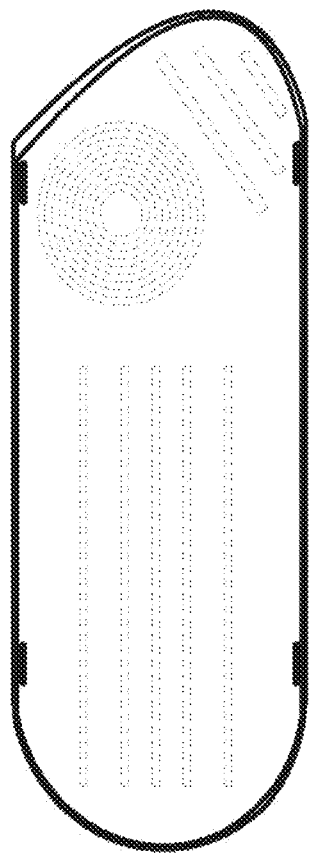
Figure 5C:
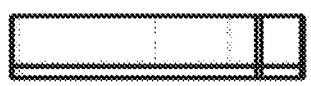
Figure 5B:
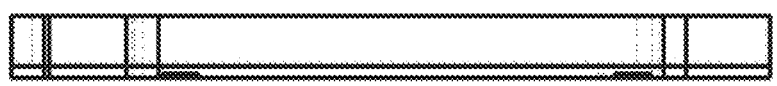

FIG. 1f depicts an example affixation of a sole 150 to the shoe 100 of FIG. 1a, according to an example embodiment. As shown in FIGS. 1f-g, the sole 150 includes a top surface 153, a bottom surface 155, and an edge 170. The edge 170 has an interior surface 172 and an exterior surface 174 and defines a perimeter of the shoe 100. Additional attachment elements may be present along portions of or the entire base structure 130, which then mate with portions of or the entire interior surface 172 of the edge 170 when the sole 150 is pressed into or otherwise mated with the base structure 130. Such an additional attachment reinforces affixation of the sole 150 with the shoe 100.

In operation, to attach the sole 150 to the shoe 100, the top surface 153 is first positioned to conform with the shape of the bottom surface 135 of the base 130. To properly align the sole 150 to the base 130 of the shoe 100, the edge 170 may be aligned to the perimeter of the base 130 such that the straps 152 are positioned over the slits extending through the sole 150. The straps 152 may then be inserted through the slits while the sole 150 is raised in the direction shown by arrows 180, until the base 130 abuts the top surface 153 of the sole 150.

To secure the sole 150 to the base 130, the second ends 156 of the straps 152 may be pulled upwards around the exterior surface 174 of the sole edge 170, to a generally folded position, until the attachment section on the second end 156 mates with an attachment section 112 on the side of the shoe 100.

FIG. 1g depicts a side view of the shoe 100 of FIG. 1f, according to an example embodiment. The bottom surface of the sole 150 may comprise a tread specific to an application for a particular sport. Example sole geometries and tread configurations are depicted in FIGS. 2a-7d, described in further detail below.

FIGS. 2a-d depict a football cleat sole 200, according to an example embodiment. The sole 200 may be the same as or similar to the sole 150 of FIG. 1a, and may be removably attachable to a shoe such as shoe 100. Apertures 252 are shown in FIG. 2c. In the example embodiment of FIG. 2c, the apertures 252 comprise a slit shape. Cleats 260 are shown extending from a bottom surface 255 of the sole 200.

FIGS. 3a-d depict a baseball cleat sole 300, according to an example embodiment. The sole 300 may be the same as or similar to the sole 150 and removably attachable to a shoe such as shoe 100. The sole 300 may be made as a single component. Cleats 360 are shown extending from a bottom surface 355 of the sole 300.

FIGS. 4a-d depict a soccer cleat sole 400, according to an example embodiment. The sole 400 may be the same as or similar to the sole 150 and removably attachable to a shoe such as shoe 100. The sole 400 may be made as a single component. Cleats 460 are shown extending from a bottom surface 455 of the sole 400.

FIGS. 5a-d depict a basketball sole 500, according to an example embodiment. The sole 500 may be the same as or similar to the sole 150 and removably attachable to a shoe such as shoe 100. The sole 500 may be made as two components: a hard plastic that attaches to the base of the shoe 100, and a softer rubber portion beneath the hard plastic. The softer rubber portion is designed to prevent injury to the wearer. An injection molding process may be used to generate the hard plastic portion, and the softer rubber portion may be generated using injection molding as well. The two pieces may be affixed to one another using an adhesive, for example.

FIGS. 6a-d depict a track and field sole 600, according to an example embodiment. The sole 600 may be the same as or similar to the sole 150 and removably attachable to a shoe such as shoe 100. The sole 600 may be made as a single component.

FIGS. 7a-d depict a running sole 700, according to an example embodiment. The sole 700 may be the same as or similar to the sole 150 and removably attachable to a shoe such as shoe 100. The sole 700 may be made as a single component.

It should be understood that variations on the illustrated athletic shoe are possible. For example, the athletic shoe may take on various sizes and/or shapes, and be constructed from various materials, depending upon the implementation.

3. CONCLUSION

The above detailed description describes various features and functions of the disclosed athletic shoe, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An article of footwear comprising:
   an upper having a first layer with an exterior surface extending from a toe portion to a heel portion;
   a base permanently affixed to or integral with the upper and having a bottom surface defined by an outer edge, the bottom surface comprising a forefoot element, a midfoot element, and a heel element, and comprising a plurality of flexible straps extending from the base;
   wherein each of the plurality of flexible straps has a first end and a second end and wherein the first end is permanently affixed to or integral with the base and the second end is a free end;
   a removable sole formed to correspond in shape with the bottom surface of the base, and having a plurality of apertures;
   wherein the second end of each of the plurality of flexible straps is insertable through one of the plurality of apertures to secure the removable sole to the base, such that the second end is attachable to the exterior surface of the first layer of the upper, and the plurality of flexible straps, after insertion though one of the plurality of apertures, wraps around only a portion of the exterior surface of the first layer of the upper, thereby forming a secure attachment.

2. The article of footwear of claim 1, wherein the plurality of apertures are slits.

3. The article of footwear of claim 1, the base comprising a first layer formed on top of a second layer, wherein the first layer is softer than the second layer to serve as a footbed.

4. The article of footwear of claim 3, the removable sole further comprising an outsole comprising a tread.

5. The article of footwear of claim 4, wherein the tread comprises cleats selected from the group of consisting of football cleats, soccer cleats, and baseball cleats.

6. The article of footwear of claim 1, wherein the upper is a foot retaining portion.

7. The article of footwear of claim 1, wherein the free end comprises an attachment section configured to mate with a corresponding attachment section on the shoe to secure the removable sole to the shoe.

8. The article of footwear of claim 1, the outer edge further comprising one or more first attachment elements.

9. The article of footwear of claim 8, the removable sole further comprising a surface having a perimeter and an edge along the perimeter, the removable sole edge comprising an interior surface and one or more second attachment elements on the interior surface.

10. The article of footwear of claim 9, wherein the one or more first attachment elements affixes to the one or more second attachment elements when the removable sole edge is fitted over the outer edge of the base.

11. An upper for an article footwear comprising:
an upper portion having a first layer with an exterior surface extending from a toe portion to a heel portion;
a base portion permanently affixed to or integral with the upper portion and having a bottom surface defined by an outer edge, the bottom surface comprising a forefoot element, a midfoot element, and a heel element, and comprising a plurality of flexible straps extending from the base;
wherein each of the plurality of flexible straps has a first end and a second end and wherein the first end is permanently affixed to or integral with the base and the second end is a free end,
wherein the second end of each of the plurality of flexible straps is insertable through a plurality of apertures in a removable sole to secure the removable sole to the upper, such that the second end is attachable to the exterior surface of the first layer of the upper, and the plurality of flexible straps, after insertion though one of the plurality of apertures, wrap around only a portion of the exterior surface of the upper, thereby forming a secure attachment.

12. The upper of claim 11, the outer edge further comprising one or more first attachment elements.

13. The upper of claim 12, the removable sole further comprising a surface having a perimeter and an edge along the perimeter, the removable sole edge comprising an interior surface and one or more second attachment elements on the interior surface.

14. The upper of claim 13, wherein the one or more first attachment elements affixes to the one or more second attachment elements when the removable sole edge is fitted over the outer edge of the base.

15. The upper of claim 11, the base comprising a first layer formed on top of a second layer, wherein the first layer is softer than the second layer to serve as a footbed.

16. The article of footwear of claim 1, wherein the outer edge is recessed with respect to the exterior of the upper.

17. The upper of claim 11, wherein the outer edge is recessed with respect to the exterior of the upper.

18. The article of footwear of claim 1, wherein the plurality of apertures extends through the base material of the removable sole.

\* \* \* \* \*